(12) United States Patent
Lefley

(10) Patent No.: US 9,026,046 B2
(45) Date of Patent: May 5, 2015

(54) LOAD MODULATING REGULATOR FOR A NEAR FILED COMMUNICATION DEVICE

(75) Inventor: Alastair Lefley, Kemble (GB)

(73) Assignee: Broadcom Corporation, Irvine, CA (US)

( * ) Notice: Subject to any disclaimer, the term of this patent is extended or adjusted under 35 U.S.C. 154(b) by 384 days.

(21) Appl. No.: 13/093,740

(22) Filed: Apr. 25, 2011

(65) Prior Publication Data

US 2011/0300798 A1 Dec. 8, 2011

(30) Foreign Application Priority Data

Apr. 23, 2010 (GB) .................................. 1006830.2

(51) Int. Cl.
*H04B 5/00* (2006.01)
*H02J 17/00* (2006.01)

(52) U.S. Cl.
CPC .............. *H04B 5/0081* (2013.01); *H02J 17/00* (2013.01); *H04B 5/0031* (2013.01); *H04B 5/0037* (2013.01)

(58) Field of Classification Search
CPC ... H04B 5/0081; H04B 5/0031; H04B 5/0037
USPC .............. 455/41.1, 41.2, 41.3, 102, 106, 107; 13/41.1, 41.2, 41.3, 102, 106, 107
See application file for complete search history.

(56) References Cited

U.S. PATENT DOCUMENTS

| | | | |
|---|---|---|---|
| 2006/0198364 A1* | 9/2006 | Fujii | 370/352 |
| 2009/0011706 A1* | 1/2009 | Wilson et al. | 455/41.1 |
| 2009/0101716 A1* | 4/2009 | Mani et al. | 235/441 |
| 2010/0098012 A1* | 4/2010 | Bala et al. | 370/329 |
| 2010/0144270 A1* | 6/2010 | Gomez et al. | 455/41.1 |

\* cited by examiner

*Primary Examiner* — Ping Hsieh
(74) *Attorney, Agent, or Firm* — Sterne, Kessler, Goldstein & Fox, P.L.L.C.

(57) ABSTRACT

A near field communications (NFC) device is disclosed that load modulates and regulates a radio frequency (RF) signal. The NFC device includes a rectifier that rectifies the RF signal to provide a direct current voltage. The NFC device also includes a modulator that modulates a data signal. The modulator provides a first voltage when the data signal is at a first level and provides a second voltage when the data signal is at a second level. The NFC device utilizes a regulator to regulate and to load modulate the RF signal. The regulator adjusts an impedance based upon a comparison of the DC voltage provided by the regulator to the first voltage provided by the modulator for the data signal at the first level or to the second voltage provided by the modulator for the data signal at the second level.

17 Claims, 3 Drawing Sheets

LOAD MODULATING REGULATOR FOR A NEAR FILED COMMUNICATION DEVICE

CROSS-REFERENCE TO RELATED APPLICATIONS

This application is a U.S. Nonprovisional Application which claims the benefit of Great Britain Application No. 1006830.2, filed on Apr. 23, 2010.

BACKGROUND

This invention relates to near field RF communicators such as active RFID tags or transponders and, for example, to a near field RF communicator having a modified modulation circuit and to methods and apparatus for deriving a clock signal from a received RF signal in an active RFID tag during modulation.

Near field RF communicators are often produced in silicon where designs produced by multiple proprietors must co-exist. Accordingly a near field RF communicator may be required to operate using a data modulation signal received from more than one source and/or from sources which use different operating voltages. It is desirable to derive a clock signal from a received RF signal in a near field RF communicator for use in demodulation of the signal and in other internal functions of the near field RF communicator. The H-field strength available for coupling to a near field RF communicator is variable and may not be known in advance and to protect a near field RF communicator from overvoltage conditions caused RF H-field signals coupled to its antenna. Thus, there is a need to protect a near field communicator from over voltage conditions caused by RF H-field signals coupled to its antenna.

BRIEF SUMMARY OF THE INVENTION

Aspects and examples of the invention are set out in the claims and relate to a near field RF communicator which has the advantage that it can derive a clock signal reliably from a received RF voltage even during load modulation of the signal and even where the data signal to be modulated is not controlled by the near field RF communicator.

In an aspect there is provided a near field RF communicator comprising an antenna operable to inductively couple with the H-field of an RF signal and a regulator to regulate an induced RF voltage in the antenna by controlling an impedance of the antenna in accordance with a data signal, wherein the data signal comprises first and second modulation voltages to define a modulation of the signal and wherein the regulator is operable to control the impedance such that the induced RF voltage is not regulated below a threshold voltage as a result of the modulation.

In an embodiment the near field RF communicator is manufactured by a semiconductor process, such as a CMOS process and the threshold voltage is based on a resolution limit of a comparator manufactured by that process. In another embodiment the threshold voltage is selected based on an expected signal to noise ratio of the induced RF voltage.

In an embodiment the regulator comprises an error amplifier arranged to control the impedance. In an embodiment the error amplifier has a first input coupled to receive a voltage based on the induced RF voltage and a second input is switchably coupled to receive one of a first and second control voltage based on the data signal wherein the control voltages are different from the first and second voltages of the data signal and wherein the smaller of the first and second voltage is the threshold voltage such that the induced RF voltage is not regulated below the threshold voltage as a result of the modulation.

In an aspect there is provided a field RF communicator having an inductive coupler for coupling to an H-field of an RF signal from another near field RF communicator in near field range to provide an induced RF voltage and having a regulator coupled to the inductive coupler and operable to regulate the induced RF voltage to be not greater than one of a first and second regulated voltages to modulate the H-Field of the RF signal in accordance with a modulation signal wherein the smaller of the first and second regulated voltages is such that a clock deriver is operable to derive a clock signal from the induced RF voltage regulated to the smaller of the first and second regulated voltages.

In an embodiment the clock deriver comprises a comparator and the smaller of the first and second regulated voltages is selected in accordance with the minimum voltage difference resolvable by the comparator.

In an embodiment the regulator comprises first and second inputs, wherein the first input is arranged to receive a voltage based on the induced RF voltage and the second input is switchable between a first and second control voltage in accordance with the modulation signal.

In an aspect there is provided a method of load modulation in a near field communicator, the method comprising receiving a data signal and modifying the data signal and modulating an impedance of an antenna of the near field communicator in accordance with the modified data signal wherein modifying the data signal comprises modifying it is such that an RF voltage provided by the antenna is not regulated to zero by the load modulation.

In an embodiment modifying the data signal comprises modifying it is such that an RF Voltage provided by the antenna is not reduced below a minimum resolvable voltage amplitude.

In an embodiment the minimum resolvable voltage amplitude is fixed by the process by which the near field communicator is manufactured. In an embodiment the minimum resolvable voltage amplitude is the minimum resolvable voltage amplitude of a comparator of the near field communicator. In an embodiment the minimum resolvable voltage amplitude is the minimum resolvable voltage amplitude of a clock deriver of the near field communicator. In an embodiment the amplitude is one of the peak-to-peak amplitude and the root mean square amplitude. Typically, as will be appreciated in the context of the present invention, regardless of how they are calculated amplitude values describe the total voltage headroom provided by a cyclic voltage excursion, in other words the amplitude is a measure of the difference between minimum and maximum voltage in a cycle.

In an aspect there is provided a near field RF communicator having an inductive coupler for coupling to an H-field of another near field RF communicator in near field range to provide an induced RF voltage, a clock deriver arranged to derive a clock signal from the induced RF voltage wherein the clock deriver requires a minimum input voltage in order to derive a clock signal, and a modulation controller arranged to control an impedance of the inductive coupler based on a modulation signal such that the amplitude of the induced RF voltage is regulated to one of a first and second voltage level wherein the second voltage level is selected in accordance with the minimum input voltage of the clock deriver.

Aspects and examples of the invention have the advantage that a near field RF communicator can operate reliably when receiving a modulation signal from functionality which has not been designed to operate with a clock deriver.

In an embodiment the near field RF communicator is an active RFID tag. An active tag is a near field RF transponder which incorporates its own power supply such as a battery. In general an active tag is capable of responding to, but not initiating, RF communication. In one possibility an active tag is maintained in a sleep or power saving mode until it is activated by a 'wake up' signal.

BRIEF DESCRIPTION OF THE FIGURES

Preferred features of the invention will now be described in greater detail, by way of example only, with reference to the accompanying drawings in which.

DETAILED DESCRIPTION OF THE INVENTION

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. The near field RF communicator may be provided wholly or partially as an integrated circuit or collection(s) of integrated circuits.

Figure 1:
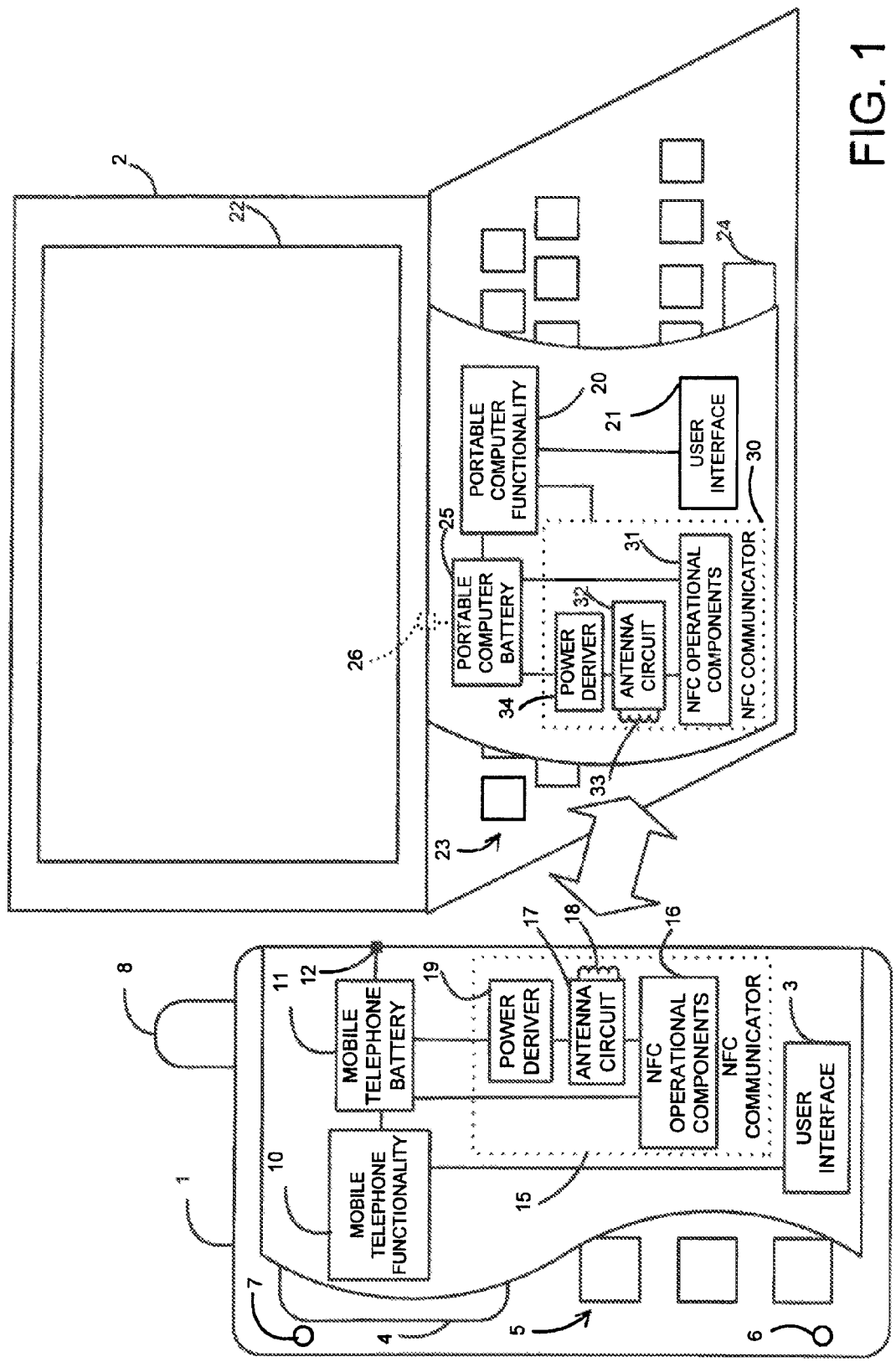
FIG. 1 shows a representational diagram illustrating communication between two devices comprising NFC communicators.

Referring now specifically to FIG. 1, there is shown a representational diagram illustrating communication between two NFC communications enabled devices. In FIG. 1 the representations of the NFC communications enabled devices have been shown partly cut-away and the functionality provided by the NFC communications enabled devices illustrated by way of a functional block diagram within the NFC communications enabled device.

As shown in FIG. 1, one NFC communications enabled device comprises a mobile telephone (cellphone) 1 and the other NFC communications enabled device comprises a portable computer 2 such as a notebook or laptop computer.

The mobile telephone 1 has the usual features of a mobile telephone including mobile telephone functionality 10 (in the form of, usually, a programmed controller, generally a processor or microprocessor with associated memory or data storage, for controlling operation of the mobile telephone in combination with a SIM card), an antenna 8 for enabling connection to a mobile telecommunications network, and a user interface 3 with a display 4, a keypad 5, a microphone 6 for receiving user voice input and a loudspeaker 7 for outputting received audio to the user. The mobile telephone also has a chargeable battery 11 coupled to a charging socket 12 via which a mains adapter (not shown) may be connected to enable charging of the battery 11. The mobile telephone 1 may have an alternative or additional power supply (not shown), for example a reserve battery or emergency battery. The chargeable battery 11 forms the primary power supply for the mobile telephone and NFC communicator 15. Given it is chargeable, it is designed to be removed at certain times.

Similarly the portable computer 2 has the usual features of a portable computer including portable computer functionality 20 in the form of, usually, a processor with associated memory in the form of ROM, RAM and/or hard disk drive, one or more removable media drives such as a floppy disk drive and/or a CDROM or DVD drive, and possibly a communications device for enabling the portable computer to connect to a network such as the Internet. The portable computer 2 also includes a user interface 21 including a display 22, a keyboard 23 and a pointing device, as shown a touchpad 24. The portable computer 2 also has a chargeable battery 25 coupled to a charging socket 26 via which a mains adapter (not shown) may be connected to enable charging of the battery 25. Again the chargeable battery 25 is the primary power supply for the portable computer and NFC communicator 30.

In addition, as shown in FIG. 1, both NFC communications enabled devices 1 and 2 have an NFC communicator 15 and 30. As shown, the NFC communicators 15 and 30 are incorporated within the larger devices and, as with the other functional bocks, may be discrete entities within the host devices or may be provided by features dispersed throughout or integrated within the host device of a part of the host device. Each NFC communicator 15 and 30 comprises NFC operational components 16 and 31 for, as will be described below, enabling control of the NFC functionality and generation, modulation and demodulation of an RF signal. Each NFC communicator 15 and 30 also comprises an antenna circuit 17 and 32 comprising an inductor or coil in the form of an antenna 18 and 33. The antenna circuits 17 and 32 enable an alternating magnetic field (I-1 field) generated by the antenna of near field. RF communicator 15 by transmission of an RF signal (for example a 13.56 Mega Hertz signal) to be inductively coupled to the antenna of near field communicator 30 when that antenna is within the near field of the RF signal generated by the one near field RF communicator 15.

The NFC communicators 15 and 30 are coupled to the mobile telephone functionality 10 and portable computer functionality 20, respectively, to enable data and/or control commands to be sent between the NFC communicator and the host device and to enable user input to the NFC communicator. Communication between the user interface 3 and user interface 21 with the NFC communicator 15 and the NFC communicator 30 is via the mobile telephone functionality 10 and host device functionality 20, respectively.

Each NFC communicator 15 and 30 also comprises a power provider 19 and 34. The power providers 19 and 34 may be power supplies within the host device or specific to the NFC communicators 15 and 30, for example a button cell battery, or other small battery. In this case as shown by dashed lines in FIG. 1, one or both of the power providers 19 and 34 comprise a coupling to derive power from the corresponding device battery 11 and device battery 25, i.e. the primary power supply.

It will be appreciated that FIG. 1 shows only examples of types of host devices. A host device may be another type of electrical device such as a personal digital assistant (PDA), other portable electrical device such as a portable audio and/or video player such as an MP3 player, an IPOD®, CD player, DVD player or other electrical device. As another possibility the NFC communicator 15 and the NFC communicator 3 may be comprised within or coupled to a peripheral device, for example in the form of a smart card or other secure element which may be stand alone or comprised within or intended to be inserted into another electrical device. For example a SIM card for use in a mobile telephone. As a further possibility such peripheral devices may comprise interfacing systems or protocols such as the single wire protocol.

Also, rather than being incorporated within the host device, the NFC communicator 15 and the NFC communicator 30 may be associated with the host device, for example by a wired or wireless coupling. In such a case, a housing of the NFC communicator may be physically separate from or may be attached to the housing of the host device; in the later case, the attachment may be permanent once made or the NFC communicator may be removable. For example, the NFC communicator may be housed within: a housing attachable to another device; a housing portion, such as a fascia of the NFC communications enabled device or another device; an access card; or may have a housing shaped or configured to look like a smart card. For example an NFC communicator may be coupled to a larger device by way of a communications link such as, for example, a USB link, or may be provided as a card (for example a PCMCIA card or a card that looks like a smart card) which can be received in an appropriate slot of the larger or host device.

In addition, one or both of the NFC communications enabled devices may be a standalone NFC communicator, that is it may have no functionality beyond its NFC communications functionality.

Figure 2:
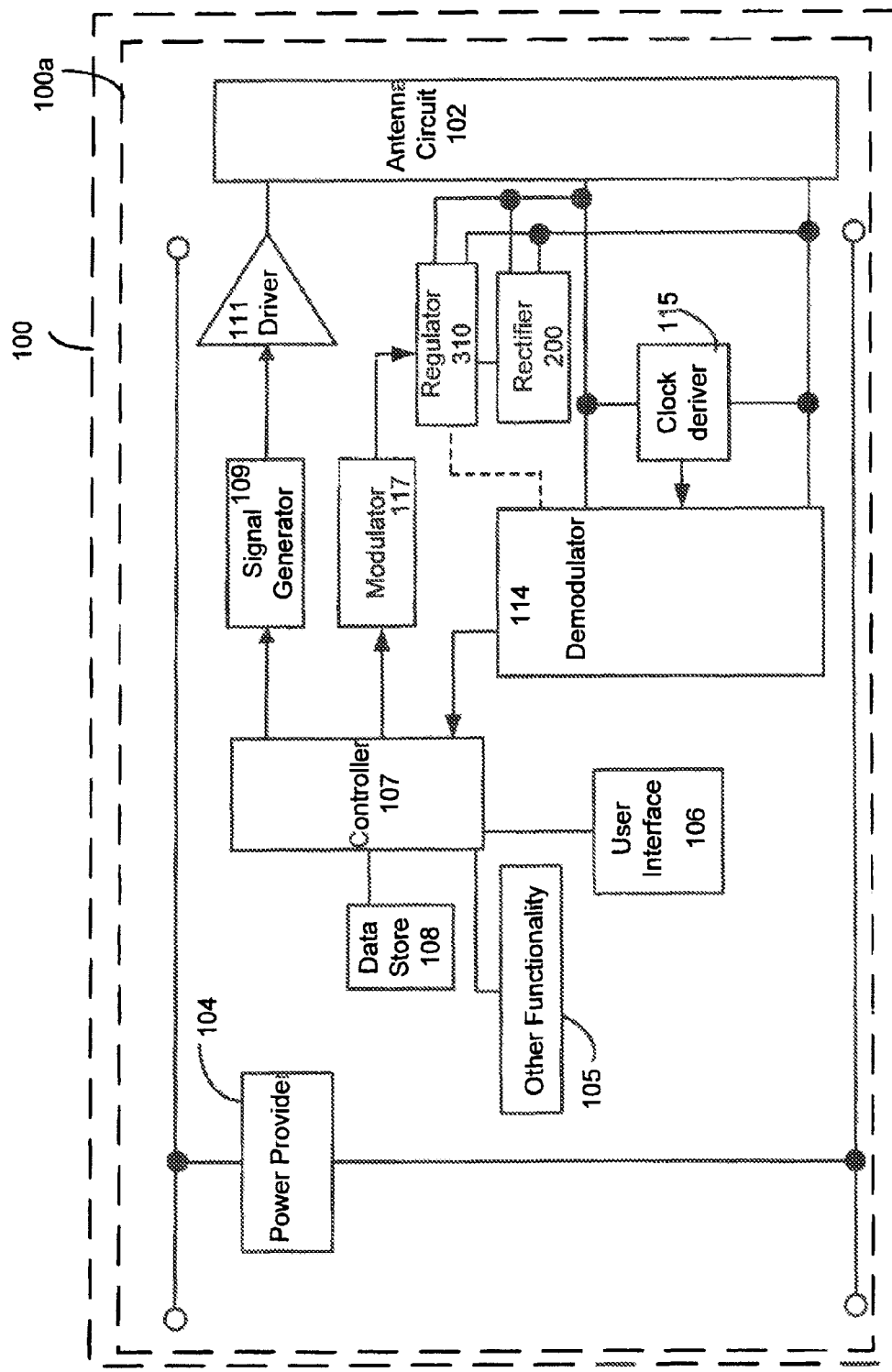
FIG. 2 shows a schematic view of components of an NFC communicator.

FIG. 2 shows a functional block diagram of an NFC communications enabled device 100 in accordance with the invention to illustrate in greater detail one way in which the NFC operational components of an NFC communications enabled device embodying the invention may be implemented.

In this example, the NFC communications enabled device 100 comprises an NFC communicator 100a having NFC operational components including an antenna circuit 102, power provider 104, controller 107, data store 108, signal generator 109 modulator 117 and demodulator 114.

The power provider 104 may be any one or more of the types of power providers discussed above. In the interests of simplicity, power supply couplings from the power provider 104 to other components are not shown in FIG. 2.

The NFC communications enabled device 100 may or may not also have or be capable of being connected or coupled with at least one of other functionality 105 (for example functionality of a host device or peripheral device such as described above) and a user interface 106.

The NFC operational components include a demodulator 114 coupled between the antenna circuit 102 and the controller 107 for demodulating a modulated RF signal inductively coupled to the antenna circuit 102 from another near field RF communicator in near field range and for supplying the thus extracted data to the controller 107 for processing. Rectifier 200 is coupled to provide a rectified output to regulator 310. Rectifier 200 and regulator 310 are coupled to the outputs AC1 and AC2 of the antenna circuit. The regulator 310 sets or regulates a voltage supply level (pin voltage) and the rectifier 200 provides rectified voltage to remainder of NFC circuit. The regulator 310 sets or regulates the voltage between the outputs AC1 and AC2 of the antenna circuit based on the voltage supply level (pin voltage) provided by the rectifier 200. As shown the demodulator 114 is coupled to the antenna circuit outputs AC1 and AC2. As another possibility, as shown in dashed line in FIG. 2, the demodulator may receive its input from the regulator 310. As a further possibility, the demodulator 114 may receive its input from the rectifier 200. In one possibility the regulator 310 regulates the voltage between the outputs AC1 and AC2 of the antenna circuit based on that voltage rather than the rectified voltage.

The NFC operational components include a modulator 117 coupled to the controller 107 and to the regulator 310 so that a modulation signal may be applied to the regulator 31 to cause the regulator to vary the load on the antenna circuit 102.

A clock deriver 115 is coupled to receive the voltage AC1-AC2 of the antenna circuit and to derive a clock signal from the voltage AC1-AC2 and is coupled to provide the derived clock signal to the demodulator 114 and can be coupled to provide the derived clock signal to any of the controller 107, the signal generator 109, the modulator 117 and/or other functionality 105 of the near field RF communicator. Any appropriate clock derivation may be used such as, for example, a clock recovery.

Together the rectifier 200 and regulator 310 protect the NFC operational components from high voltages received at antenna circuit 102. For example the regulator may limit the voltage to 3.3 or 1.8 volts dependent on the voltage tolerance of the NFC operational components. Any suitable regulator and rectification circuit can be used for this. The NFC operational components may also include an amplifier for amplifying an RF signal inductively coupled to the antenna circuit 102.

In addition the NFC operational components include components for enabling modulation of an RF signal to enable data to be communicated to another near field RF communicator in near field range of the NFC communicator 100a. The data to be communicated is provided from controller 107 to modulator 117 and as shown in FIG. 2, modulator 117 is arranged to control regulator 310 to modulate the effective impedance of the antenna circuit 102 in order to load modulate an RF H-field inductively coupled to the antenna circuit 102. Drive elements are also provided for providing a modulated RF signal to the antenna these components comprise a signal generator 109 coupled via a driver 111 to the antenna circuit 102. In this example, the signal generator 109 causes modulation by gating or switching on and off the RF signal in accordance with the data to be communicated. The NFC communicator may use any appropriate modulation scheme that is in accordance with the standards and/or protocols under which the NFC communicator operates. As another possibility a separate or further signal controller may be incorporated within the NFC operational components to control modulation of the signal generated by the signal generator 109 in accordance with data or instructions received from the controller 107.

The NFC operational components also include a controller 107 for controlling overall operation of the NFC communicator. The controller 107 is coupled to a data store 108 for storing data (information and/or control data) to be transmitted from and/or data received by the NFC communications enabled device. The controller 107 may be a controller of a host device and/or a microprocessor, for example a RISC processor or other microprocessor or a state machine. Program instructions for programming the controller and/or control data for communication to another near field RF communicator may be stored in an internal memory of the controller and/or the data store.

The NFC communicator 100a may operate in an initiator mode (that is as an initiating near field RF communicator) or a target mode (that is as a responding near field RF communicator), dependent on the mode to which the NFC communicator is set. The mode may be determined by the controller 107 or may be determined in dependence on the nature of a received near field RF signal. When in initiator mode, an NFC communicator initiates communications with any compatible responding near field RF communicator capable of responding to the initiating NFC communicator (for example an NFC communicator in target mode or an RFID tag or transponder) that is in its near field range, while when in target mode an NFC communicator waits for a communication from a compatible initiating near field RF communicator (for example an NFC communicator in initiator mode or an RFID initiator or transceiver). As thus used, compatible means operable at the same frequency and in accordance with the same protocols, for example in accordance with the protocols set out in various standards such as ISO/IEC 18092, ISO/IEC 21481, ISO/IEC 14443 and ISOIIEC 15693. NFC communicators commonly operate at or around 13.56 MHz.

When in initiator or target mode, the NFC communicator may communicate in accordance with an active or passive protocol. When using an active protocol the initiating NFC communicator will transmit an RF field and following completion of its data communication, turn off its RF field. The responding near field RF communicator (target) will then transmit its own RF field and data before again turning off the RF field and so on. When using a passive protocol the NFC communicator (initiator) will transmit and maintain its RF field throughout the entire communication sequence. The protocol used will depend on instructions received from the controller 107 and the response received from a responding near field RF communicator.

In FIG. 2 control of operation of the NFC communicator is through controller 107. As another possibility where the NFC communicator is comprised as part of a host device, control of the operation of the NFC communicator may be directed by the host device, for example through other functionality 105. In such circumstances all or part of the control may be provided by other functionality 105. For example the NFC communicator controller 107 may control modulation and modulation protocols whereas the data to be transmitted may be directed by the host device through other functionality 105 or through controller 107. In these circumstances the voltage levels of the modulation signal are set by the host device.

The NFC communicator also comprises an antenna circuit 102. The design of the antenna circuit will depend on the NFC communicator 100 and the environment in which it operates. For example the antenna circuit may be in the form described for co-pending international patent application number PCT/GB2008/000992 (which claims priority from GB 0705635.1).

An example of a regulator that may be used in the NFC communicator such as that shown in FIG. 2 will now be described with reference to FIG. 3.

Figure 3:
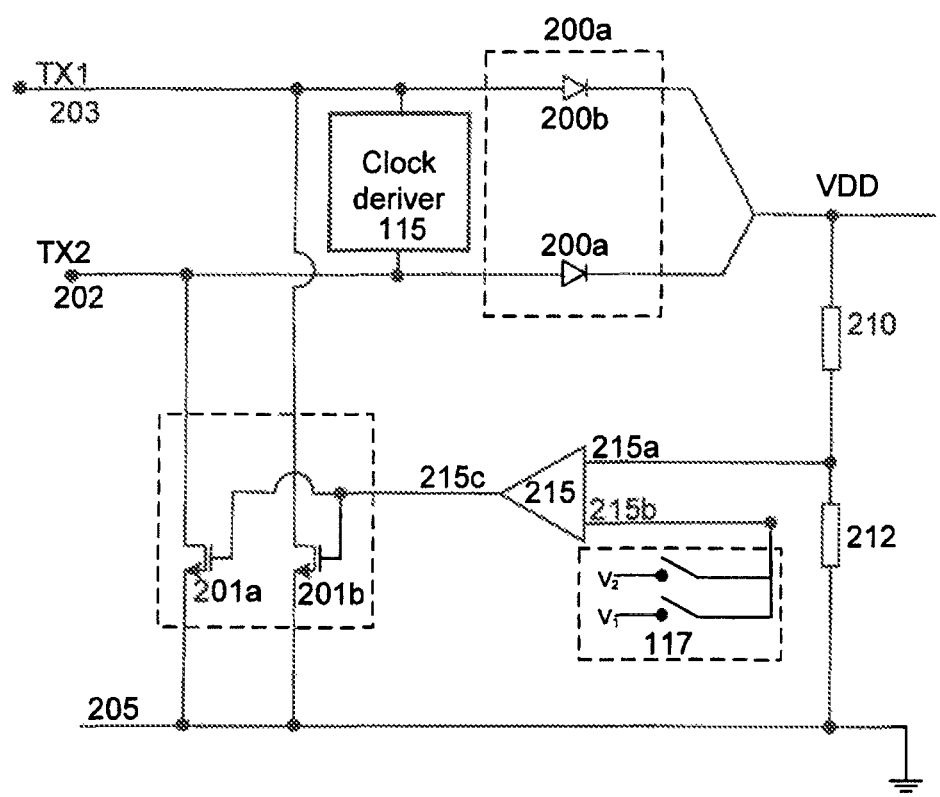
FIG. 3 shows a load modulation circuit for use in an example of the invention.

FIG. 3 shows connection 202 is coupled via shunt element 201a to ground or reference voltage connection 205 and via rectifying element 200a and to resistance 210. Connection 203 is coupled via shunt element 201b to ground or reference voltage connection 205 and via rectifying element 200b to resistance 210. Resistance 210 couples the output of rectifying elements 200a and 200b to resistance 212 which couples resistance 210 to ground or reference connection 205. The two resistances 210 and 212 are arranged as a potential divider between the rectifier output voltage VDD and ground 205. Amplifier 215 has first and second inputs 215a and 215b. The first amplifier input 215a is coupled to the rectifier output voltage VDD by resistance 210 and to ground or reference voltage connection 205. Second amplifier input 215b is coupled to a modulator 117. Modulator 117 is arranged to receive a control signal from controller 107 of the near field communicator. Amplifier output 215c is coupled to provide a control voltage for controlling shunt elements 201a and 201b. Clock deriver 115 is coupled between connections 202 and 203.

Rectifying elements 200a and 200b are components of a rectifier 200 arranged to provide a rectified voltage VDD. Modulator 117 is arranged to provide either a first voltage V1 or a second voltage V2 to the second amplifier input 215b and thereby to control the output of the amplifier based on the rectified voltage VDD. In the example of FIG. 3 an arrangement of switches is arranged to provide this function however, as will be appreciated, this control can be achieved by any other appropriate means such as, for example, a level shifter or pulse generator. In operation connections 202 and 203 are coupled to receive RF voltages TX1 TX2 from an inductive coupler (FIG. 2) such that shunt elements 201a and 201b represent an impedance load coupled in parallel with the inductive coupler. Varying the impedance of shunt elements 201a and 201b causes the load on the inductive coupler to be varied to provide modulation of an H-field coupled to the inductive coupler.

Rectifying elements 200a and 200b provide a rectified voltage VDD which is coupled to resistance 210 to provide an input voltage to amplifier input 215a. Modulator 117 is arranged to provide either a first voltage V1 or a second voltage V2 to the second amplifier input 215b and thereby to control the output of amplifier 215 based on the rectified voltage VDD. In operation the voltage at the amplifier output 215c will control shunt elements 201a and 201b such that, if VDD exceeds the voltage at amplifier input 215b the shunt elements are biased into a conducting state to reduce the voltage at TX1, TX2 (and thus VOD) until the voltages at amplifier inputs 215a, 215b are equalised.

As will be appreciated varying the voltage at amplifier input 215b indirectly varies the load on an inductive coupler coupled between 202 and 203 and therefore can provide load modulation of an RF H-field inductively coupled to said inductive coupler.

In operation, when an RF voltage is received at by the antenna circuit 102 clock deriver 115 operates to derive a clock signal from the RF voltage which is used in modulation and demodulation functions of the NFC communicator. In order to communicate data by modulation of the received RF signal a modulation signal provided by controller 107 is coupled to modulator 117. Modulator 117 controls amplifier input 215b to vary between first and second voltage levels V1 and V2 which are selected in accordance with the parameters of the NFC operational components. In the example of FIG. 3, modulator 117 employs an arrangement of switches to switch the amplifier input 215b between the first and second voltage levels, V1 and V2. The modulator can include a band gap reference voltage and a voltage divider to divide the band gap voltage to provide the first and second voltage levels. The second (upper) voltage level is selected according to the over upper voltage limit of the silicon and the first (lower) voltage level is selected based on the minimum operating voltage of the clock deriver 115. The clock deriver 115 can comprise a voltage comparator and the minimum operating voltage of the clock deriver 115 is based on the minimum voltage resolvable by the comparator. However often a received RF signal is subject to noise and the minimum operating voltage of a clock deriver may be set by the noise on the received RF signal and/or the signal to noise ratio in order to achieve an acceptable accuracy/error rate of the clock signal.

Optionally, the modulator 117 is arranged to control the output of amplifier 215 by providing a constant voltage to amplifier input 215b and to control the impedance of one or both of resistances 210 and 212 such that the RF signal is regulated/modulated as set out above.

In this way the NFC operational components are protected from over voltage conditions, load modulation and regulator function can be provided using a small number of components and the NFC communicator can operate reliably even when the data modulation signal is provided by a controller of a host device (or designed according to different processes) without compromising operation of the clock deriver 115.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A near field communications (NFC) device, comprising:
   a rectifier configured to rectify a received signal to provide a rectified signal;
   a regulator. having an impedance. configured to regulate and to load modulate the received signal by adjusting the impedance based upon a comparison of the rectified signal and a modulator output signal; and
   a modulator configured to select from among a first input and a second input and to provide the modulator output signal to the regulator, the modulator output signal being at a first level when the first input is selected or at a second level when the second input is selected, the second level being greater than the first level.

2. The NFC device of claim 1, further comprising:
   a clock deriver configured to derive a clock signal from the received signal; and
   a demodulator configured to recover information from the received signal based upon the clock signal.

3. The NFC device of claim 2, wherein the first level is based upon an operating voltage of the clock deriver.

4. The NFC device of claim 1, wherein the first level is based on a signal to noise ratio of the received signal.

5. The NFC device of claim 1, wherein the second level is based on a voltage tolerance of the NFC device.

6. The NFC device of claim 1, wherein the regulator is configured to:
   cause a decrease in the impedance when the rectified signal is greater than the modulator output signal; and
   cause an increase in the impedance when the rectified signal is less than the modulator output signal.

7. The NFC device of claim 1, wherein the regulator comprises:
   an error amplifier configured to compare the rectified signal and the modulator output signal to provide an error signal that is indicative of a difference between the rectified signal and the modulator output signal.

8. The NFC device of claim 7, wherein the regulator further comprises:
   a shunt element, characterized by the impedance, configured to regulate and to load modulate the received signal based on the error signal.

9. The NFC device of claim 8, wherein the shunt element is further configured to
   enter into a nonconductive state when the rectified signal is equal to the modulator output signal; or
   enter into a conductive state when the rectified signal is greater than the modulator output signal.

10. The NFC device of claim 1, wherein the modulator comprises:
    a switching module configured to select from among the first input and the second input based upon a modulation signal from a controller.

11. A near field communications (NFC) device, comprising:
    a rectifier configured to rectify a received signal to provide a rectified signal;
    a regulator configured to regulate and to load modulate the received signal to a first voltage or to a second voltage based upon an output signal;
    an amplifier configured to compare the rectified signal with a modulator output signal to provide the output signal to the regulator to control the regulation and the load modulation of the received signal; and
    a modulator configured to select from among a first input and a second input and to provide the modulator output signal to the amplifier, the modulator output signal being at a first level when the first input is selected or at a second level when the second input is selected, the second level being greater than the first level.

12. The NFC device of claim 11, wherein the regulator comprises:
    an impedance, and
    wherein the regulator is further configured to adjust the impedance based upon the modulator output signal.

13. The NFC device of claim 12, wherein the regulator is further configured to:
    cause a decrease in the impedance when the rectified signal is greater than the modulator output signal; or
    cause an increase in the impedance when the rectified signal is less than the modulator output signal.

14. The NFC device of claim 12, wherein the regulator further comprises:
    a first load modulation impedance, the regulator being further configured to load modulate the received signal using the first load modulation impedance when the modulator output signal is at the first level; and
    a second load modulation impedance, the regulator being further configured to load modulate the received signal using the second load modulation impedance when the modulated output signal is at the second level.

15. The NFC device of claim 14, wherein the impedance comprises the first load modulation impedance or the second load modulation impedance.

16. The NFC device of claim 11, further comprising:
    a clock deriver configured to derive a clock signal from the received signal; and
    a demodulator configured to recover information from the received signal based upon the clock signal.

17. The NFC device of claim 11. wherein the regulator comprises an error amplifier, the output signal comprising an error signal that is indicative of a difference between the rectified signal and the modulator output signal.

* * * * *

UNITED STATES PATENT AND TRADEMARK OFFICE
CERTIFICATE OF CORRECTION

| | | |
|---|---|---|
| PATENT NO. | : 9,026,046 B2 | Page 1 of 1 |
| APPLICATION NO. | : 13/093740 | |
| DATED | : May 5, 2015 | |
| INVENTOR(S) | : Alastair Lefley | |

It is certified that error appears in the above-identified patent and that said Letters Patent is hereby corrected as shown below:

Title page, item (54), and in the Specification, column 1, Title, please replace "filed" with --field--

In the Claims

Column 9, line 21, claim 1, please replace "regulator. having" with --regulator, having--

Column 9, line 21, claim 1, please replace "impedance. configured" with --impedance, configured--

Signed and Sealed this
Fifteenth Day of September, 2015

Michelle K. Lee
*Director of the United States Patent and Trademark Office*